United States Patent [19]
Navickas

[11] Patent Number: 6,126,113
[45] Date of Patent: Oct. 3, 2000

[54] HELICOPTER REMOVABLE DRIVE TRAIN PLATFORM

[76] Inventor: Thomas Joseph Navickas, 2278 Palmetto Dr., Clearwater, Fla. 33763-2222

[21] Appl. No.: 09/158,358

[22] Filed: Sep. 21, 1998

[51] Int. Cl.[7] ..................................... B64C 1/00
[52] U.S. Cl. ......................... 244/120; 244/17.11; 244/54
[58] Field of Search ................................ 244/17.11, 120, 244/54, 2; 416/244 R

[56] References Cited

U.S. PATENT DOCUMENTS

| | | | |
|---|---|---|---|
| 2,973,923 | 3/1961 | Sznycer | 244/17.11 |
| 4,676,545 | 6/1987 | Bonfilio et al. | 244/120 |
| 4,895,321 | 1/1990 | Huhn et al. | 244/120 |
| 5,046,979 | 9/1991 | Ragan et al. | 244/54 |
| 5,562,264 | 10/1996 | Bietenhader | 244/120 |
| 5,975,464 | 11/1999 | Butan | 244/120 |

*Primary Examiner*—J. Woodrow Eldred
*Attorney, Agent, or Firm*—Ronald E. Smith; Smith & Hopen, P.A.

[57] ABSTRACT

A modular rotary wing aircraft includes a modular cockpit, central frame section, tailboom assembly, landing gear, flight control components and other modular parts so that those parts can be interchanged and interconnected to form differing helicopters to accommodate the requirement of differing tasks. A drive train platform is releasably mounted atop the fuselage formed by the interconnection of the cockpit, central frame section, and tailboom assembly. Modular hydraulic servos, a transmission and rotary propulsion unit, a gas turbine engine, and an engine oil cooling system are releasably mounted to the drive train platform. The drive train platform and all components mounted on it are removable as a unit from the fuselage so that inspection, repair, and maintenance can be performed at bench top level in a controlled environment. A helicopter requiring maintenance or repair spends little time out of service because its drive train platform and all flight-producing components mounted thereon can be replaced with a previously inspected and maintained drive train platform in a short period of time. Savings are substantial because the modular, replaceable drive train platform reduces down time for maintenance procedures and the modularity of the various helicopter parts obviates the need to purchase conventional fully integrated helicopters for different tasks.

12 Claims, 6 Drawing Sheets

HELICOPTER REMOVABLE DRIVE TRAIN PLATFORM

BACKGROUND OF THE INVENTION

1. Field of the Invention

This invention relates, generally, to helicopters. More particularly, it relates to a modular helicopter construction that enables mixing differing modular sections to provide multiple helicopter configurations and which also facilitates maintenance and repair of modular parts that collectively form the helicopter drive train.

2. Description of the Prior Art

Since their invention, helicopters have been built as integral units. Thus, each helicopter has been designed with a specific task in mind. For example, small, light-in-weight helicopters with small engines have been designed for light lifting jobs, and heavy helicopters with large engines have been designed for heavy lifting jobs, and so on. There are numerous helicopter designs, each of which is intended to maximally perform particular functions.

A major drawback of conventional helicopter design is that it requires helicopter owners to purchase multiple helicopters to perform multiple tasks. A rancher might need a very light-lifting helicopter to spray fields with pesticides, for example, and a more heavy duty helicopter for transporting heavy equipment over hills or mountains. It would be advantageous if a light-duty helicopter could incorporate modular features so that it could be converted into a heavy duty helicopter, or vice versa. This would enable a user to own two engines of differing capabilities, for example, instead of two complete helicopters. However, the ability to switch from an engine capable of lifting a light payload to an engine capable of lifting a heavy payload would require a helicopter of modular construction and such helicopters were heretofore unknown.

If the engine of a helicopter is to be changed, there will sometimes be a need to change other parts of the helicopter as well. For example, switching from one engine to another might require that the tailboom of the helicopter also be changed. In some cases, there might also be a need to change the sled landing gear as well, and so on. Therefore, what is needed is a fully modular helicopter having a modular drive train, a modular cockpit section, modular flight component control means, a modular central frame, a modular tailboom section, a modular sled, and so on.

The transmissions, rotors, and other parts of the drive train of conventional helicopters are mounted atop the fuselage with appropriate bolts, nuts and other suitable fasteners. Accordingly, when it is time to perform routine maintenance procedures, the personnel performing the work must stand on ladders, scaffolds, or other elevated platforms to reach the various parts of the drive train. The work is uncomfortable because the worker is not only forced to stand on a ladder, he or she is also forced to stretch, bend, reach, and perform other difficult maneuvers of the body to gain access to all parts.

Moreover, since many parts of the aircraft must be completely disassembled and reassembled to comply with Federal Aviation Authority (FAA) regulations, the helicopter undergoing maintenance and its flight crew are out of service for extended periods of time.

Accordingly, a modular means that would facilitate routine maintenance of all drive train parts is needed as well.

However, in view of the prior art in at the time the present invention was made, it was not obvious to those of ordinary skill in the pertinent art that a modular helicopter is desirable, nor was it obvious how a modular helicopter could be provided.

SUMMARY OF THE INVENTION

The long-standing but heretofore unrecognized and unfulfilled need for an improved helicopter design that overcomes the limitations of earlier designs is now provided in the form of a helicopter having modular parts. The novel helicopter construction includes a cockpit section of modular construction, a central frame section of modular construction, and a tailboom section of modular construction. A first attachment means connects a trailing end of the modular cockpit section to a leading end of the modular central section and a second attachment means connects a trailing end of the modular central frame section to a leading end of the tailboom section. A fuselage is formed by the attachment of the cockpit section to the central frame section and the attachment of the central frame section to the tailboom section. In this way, differing modular cockpit sections may be selectively connected to differing modular central frame sections and differing modular central frame sections may be connected to differing modular tailboom sections. Accordingly, different combinations of said differing modular sections are formed to provide differing helicopters for use in differing tasks.

The novel helicopter construction further includes a drive train platform of modular construction that is adapted to be releasably attachable in surmounting relation to the fuselage. The novel drive train platform also has utility in connection with nonmodular helicopter constructions as well.

A plurality of flight-providing components are detachably secured to the drive train platform. The flight-providing components are connected to one another in an operative configuration so that removing the drive train platform from the helicopter also removes the flight-providing components therefrom and maintains the flight-providing components in their interconnected relation to one another so that they may be tested and maintained as a unit if desired.

The flight-providing components include, but are not limited to, a servo means, a transmission and rotary propulsion unit, an engine, and an engine oil cooling means. Each of said flight-providing components is independently replaceable with another flight-providing component having a different capability so that the drive train platform is reconfigurable for differing tasks, thereby avoiding a need to acquire differing complete helicopters for differing tasks.

The novel cockpit construction includes a fore and aft construction. The novel central frame section includes an access opening that is selectively closable by a roll-away door means. It also includes an avionics compartment and a battery compartment.

A modular landing sled section is releaseably attachable to an underside of the fuselage so that differing modular landing sled sections may be connected to differing fuselages.

An important object of the invention is to enable helicopter owners to purchase modular parts so that many different helicopters can be configured for differing tasks at a cost substantially less than the cost of purchasing a conventional, nonmodular helicopter for each task.

Another major object of this invention is to provide a helicopter design having a modular drive train platform that surmounts the fuselage of a helicopter and which is readily detachable therefrom.

An object closely related to the foregoing object is to provide modular flight-providing components such as hydraulic servos, transmission and rotary propulsion means, gas turbine engines, engine oil cooling means, and the like that are detachably mounted atop the drive train platform so that they can be removed as a whole from a helicopter by removing the drive train platform therefrom.

These and many other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
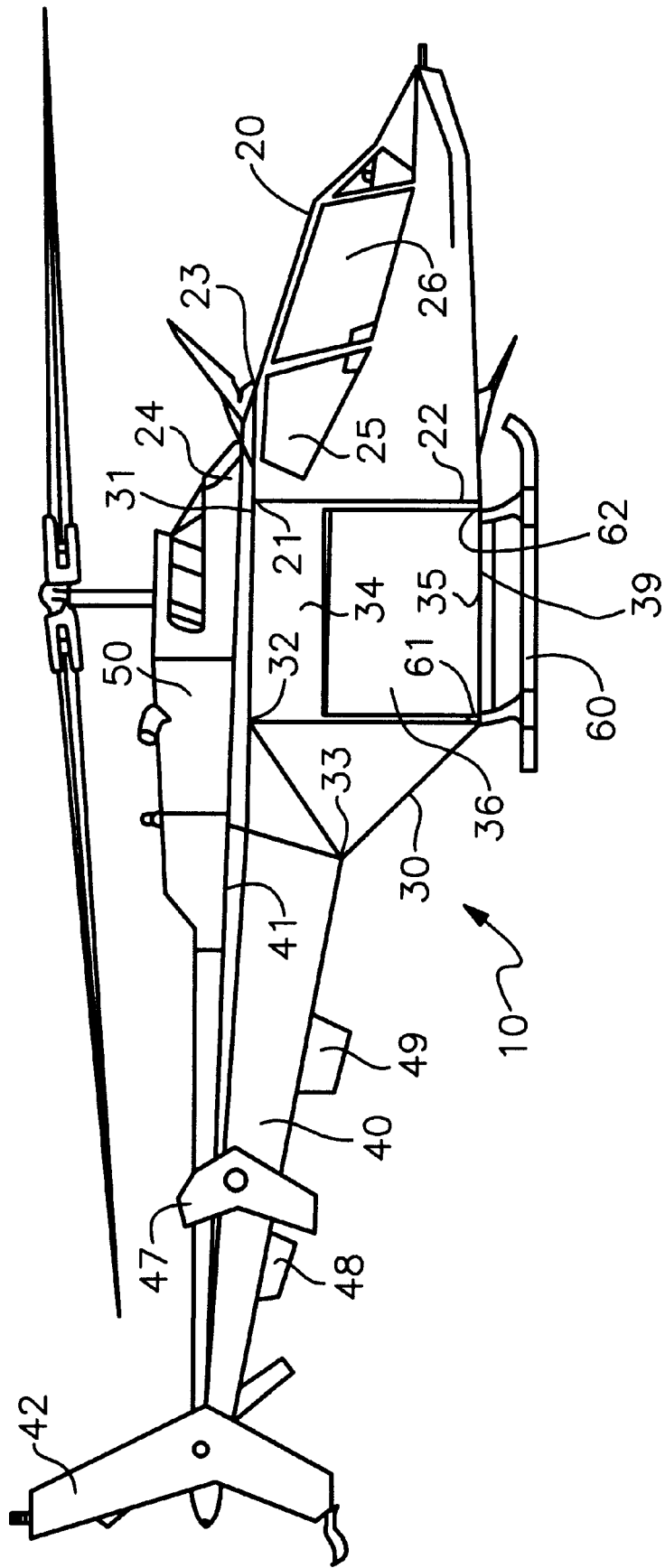
FIG. 1 is a side elevational view of a preferred embodiment of the novel modular helicopter.

Referring now to FIG. 1, it will there be seen that an illustrative embodiment of the present invention is denoted as a whole by the reference number 10.

Figure 2:
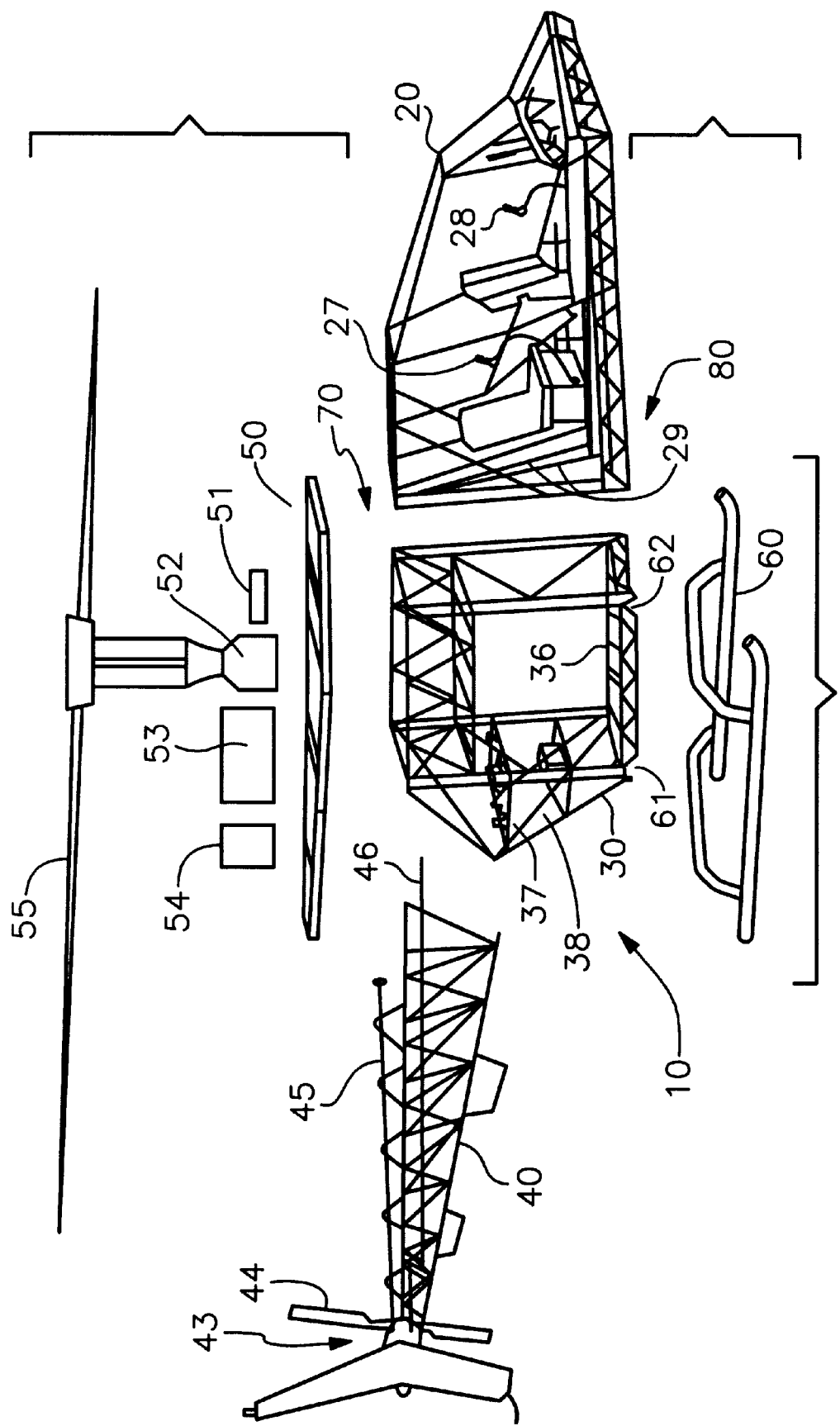
FIG. 2 is an exploded view thereof, with the cowlings and skin removed.

Helicopter 10 includes a modular cockpit section 20 having fore and aft seating arrangements 25, 26, and fore and aft modular flight control means 27, 28 (FIG. 2). Cockpit 20 is attached to modular freight compartment 36 at attachment points 21 and 22 and to the forward end of the novel modular drive train platform, disclosed hereinafter, at attachment points 23, 24. Additional attachment points, not shown, are on the unillustrated opposite side of helicopter 10.

Modular center frame 30 of helicopter 10 includes a fuel cell 34, bench seats 35, freight compartment 36 closed by roll-away door 39, avionics compartment 37 having a detachable cannon plug means, and battery compartment 38 having a detachable cannon plug means. Fuel cell 34 is replaced with a larger or smaller fuel cell when the modular flight component means 52, 53 55 are changed.

Center frame 30 is secured to the novel drive train platform at attachment points 31 and 32, and to modular tailboom assembly 40 at 32, 33.

Tailboom assembly 40 is attached to the novel drive train platform at point 41. Assembly 40 includes tail rotor gear box 43 and tail rotor blades 44, tail rotor drive shaft 45, and tail rotor control rod assembly 46. Said assembly 46 provides aerodynamic control and stability by controlling the respective instantaneous positions of tail rotor blades 44 (FIG. 2).

The novel drive train platform of this invention is denoted 50 as a whole. The items mounted on it, instead of onto the fuselage as in prior art designs, include servomechanisms 51, transmission and rotary propulsion mechanism 52, gas turbine engine 53, and engine oil cooling system 54.

As best understood in connection with FIG. 2, the fuselage of helicopter 10 is denoted as a whole by reference numeral 80 and its flat upper surface is denoted as a whole by the reference numeral 70. Novel drive train platform 50 is also flat, as depicted in FIG. 2, and thus lies evenly atop flat surface 70 of fuselage 80 when secured thereto.

Helicopter 10 further includes modular landing gear 60 of skid design which is attached to the lower end of fuselage 80 at attachment points 61, 62 and similar unillustrated attachment points on the opposite side of the craft.

Figure 3:
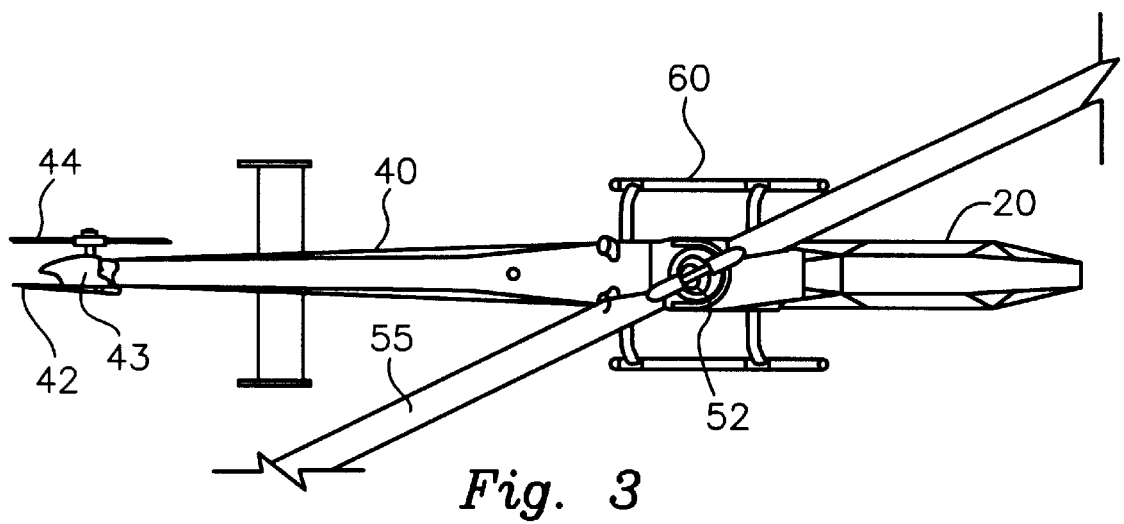
FIG. 3 is a plan view of the novel modular helicopter.
Figure 4:
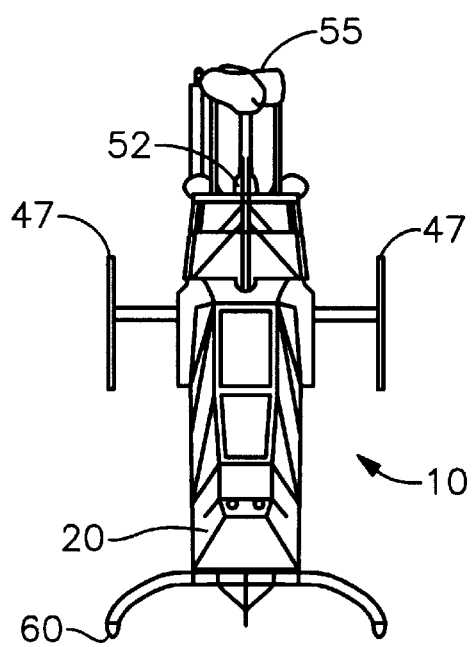
FIG. 4 is a front view thereof.

FIGS. 3 and 4 provide top plan and front elevational views, respectively, of the novel helicopter 10. Note that novel drive train platform 50 is substantially concealed from view in that it is not readily apparent to the casual onlooker. In FIG. 4, rotor blades 55 have been folded back into substantially parallel relation to one another.

The exceptionally narrow aspect of helicopter 10 is also worth noting. Its tandem seating enables both the pilot and the co-pilot to share a substantially unrestricted view in all directions, unlike the side-by-side seating of conventional helicopters where a spotter, for example, can see things that are not visible to the pilot.

Figure 5:
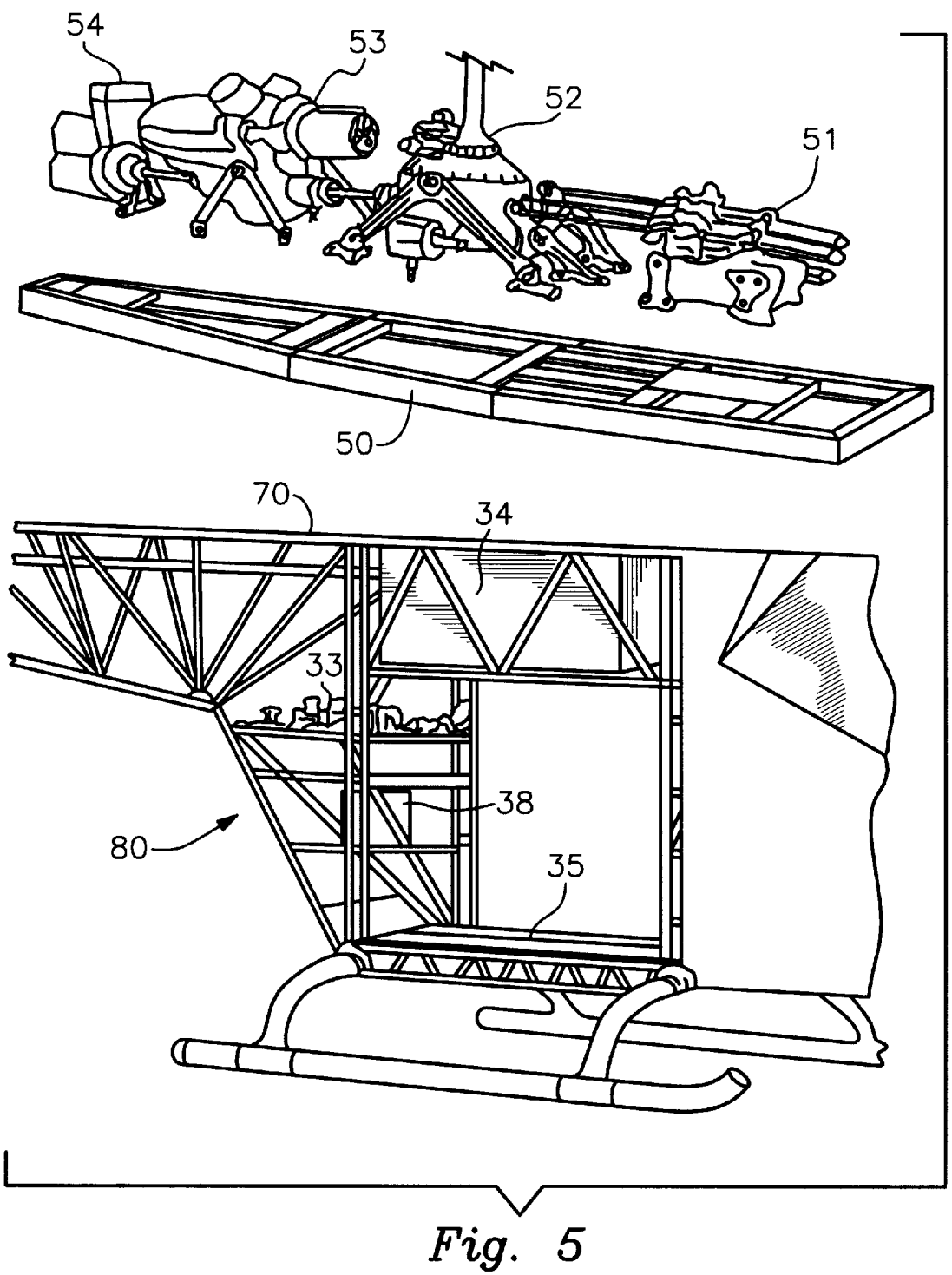
FIG. 5 is an exploded perspective view of selected parts of the novel modular helicopter.

Turning now to FIG. 5, it will there be seen that servos 51, transmission and rotary propulsion mechanism 52, gas turbine engine 53, and engine oil cooling system 54 are shown in greater detail, in exploded view relative to novel drive train platform 50 and fuselage 80. All of these maintenance-requiring parts are individually secured to novel drive train platform 50 and not to fuselage 80 as in the prior art. Accordingly, by detaching platform 50 from flat surface 70 of fuselage 80, all of said parts 51, 52, 53, and 54 may be transported to a controlled environment for maintenance purposes. Advantageously, platform 50 and said parts mounted thereatop may be placed on a workbench surrounded by comfortable seats so that all further work can be performed in the absence of ladders, elevated platforms, and the like.

Significantly, as soon as novel platform 50 has been removed from helicopter 10 by a fork lift truck, overhead crane, winch means, or the like, a previously-serviced platform 50 may be secured to said helicopter 10. In this way, a helicopter and its flight crew are grounded only for the brief period of time required to detach the to-be-serviced platform 50 from the aircraft and to attach an already-serviced platform.

The modular aspect of drive train platform 50 also enables servicing of flight-providing components 51, 52, 53, and 54 to be conducted in a regularly scheduled sequence when a fleet of helicopters is being maintained. The owner of only one complete helicopter may also adopt fleet maintenance techniques by owning two drive train platforms and the flight-providing components mounted thereatop and scheduling maintenance in such a way as to maintain the aircraft in service substantially all the time.

Still another advantage provided by the modular aspect of this invention is that a larger or smaller gas turbine engine 53 can be substituted for the original gas turbine engine so that differing jobs can be performed without purchasing additional helicopters. In the nonmodular designs of the prior art, when a job requires increased lifting power, for example, the owner of a helicopter restricted to light lifting jobs would be compelled to purchase another, more powerful helicopter. However, with novel drivetrain platform 50, the original helicopter can still be used, and all the owner needs to do is to purchase a higher horsepower engine for mounting on drive train platform 50. This can easily save the owner more than a million dollars. Similarly, the owner of a heavy payload helicopter wastes considerable amounts of fuel when using the helicopter for light payload jobs. In that situation, mounting a smaller gas turbine engine atop novel platform 50 is much less expensive than purchasing a smaller helicopter.

The modular aspect of this invention is not restricted just to the novel drive train platform and to gas turbine engines. As depicted in FIG. 2, it should be clear that the modular parts of the novel aircraft include modular cockpit section 20, modular central frame section 30, and modular tail boom section 40, in addition to drive train platform 50 and components 51–54. Therefore, if an application calls for a transmission and rotary propulsion unit 52 with longer blades than the blades initially purchased, tailboom section 40 is detached from central frame section 30 and a new tailboom section rated for performance with the larger unit 52 having longer blades is secured to said central section 30. Similarly, where a compact but heavy weight requires transport, the existing cockpit 20 and tailboom section 40 may be sufficient, and the substitution of a smaller central frame section 30 may compensate for the concentrated weight. This could require a four-bladed rotary system 52 having shorter blades and in such event there may be no need to change tailboom section 40, but there could be a need to change landing gear 60 to enable safe handling of the load. The point is that the modularity of the novel aircraft opens up many possibilities for efficiencies and savings heretofore unobtainable.

Figure 6:
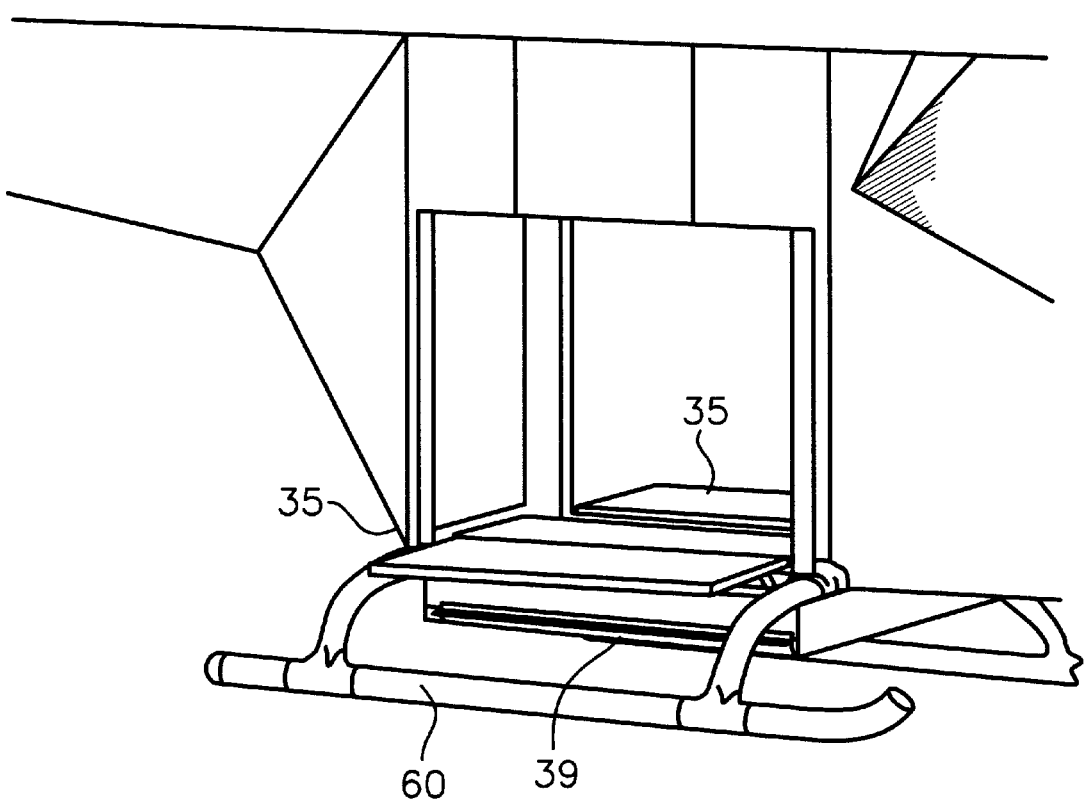
FIG. 6 is a perspective view of the central frame section of said helicopter, depicting a door that forms a part thereof in its open configuration.

Bench seats 35 may be folded flat when not in use to increase the holding capacity of central frame section 30. Moreover, said bench seats may be mounted wholly inside said central frame section 30 as depicted in FIG. 5, or they may be mounted so that they are positioned outside of said section 30 when folded down as depicted in FIG. 6. Note that a runner of landing sled 60 serves as a footrest when the benches 35 are in their FIG. 6 configuration.

Figure 7:
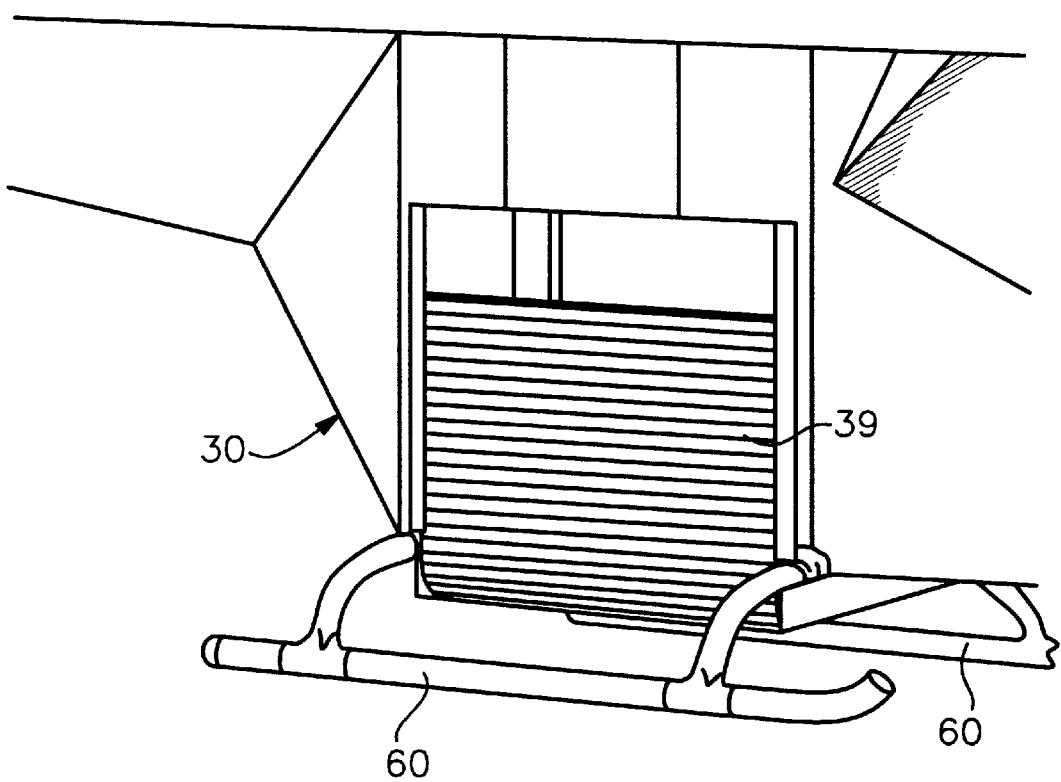
FIG. 7 is a view like that of FIG. 6, but depicting the door in its closed configuration.

FIGS. 6 and 7 indicate that roll-away door 39 deploys upwardly from the bottom of the opening that it closes. When closed, it conforms to the shape of the fuselage and thus maintains the aerodynamic characteristics of the aircraft.

It should be appreciated that the hydraulic servomechanisms 51, transmission and rotary propulsion mechanism 52, gas turbine engine 53, and engine oil cooling system 54 are not only connected to the modular drive train platform; they are also connected by electrical, hydraulic and mechanical control means including cables, hoses, clamps, and the like to the fuselage. These hoses and other connectors must also be disconnected when removing the modular drive train platform 50 from fuselage 80 (FIG. 2), and reconnected when re-attaching platform 50. The time required for such disconnections and re-attachments is brief.

Those familiar with helicopter design will also appreciate that when various modular parts are interchanged, the vertical rotational axis of the rotary propulsion means must always be in vertical alignment with the center of gravity of the modular freight compartment (central frame section 30). Moreover, when engine means are changed, a safe power-to-weight ratio must always be maintained. Any reconfiguration of the modular rotary wing aircraft must always maintain a safe aerodynamic configuration, i.e., the resulting aircraft must be in compliance with all applicable safety regulations.

Another advantage of the ability to move the servos 51, transmission and rotary propulsion mechanism 52, gas turbine engine 53, and engine oil cooling means 54 as a unit while still mounted on drive train platform 50 is that it enables bench top testing of all major flight producing components (except the blades) in a configuration where they are still completely interconnected to one another as when in flight, thereby facilitating trouble shooting of problems.

Still another advantage is that the individual components may be inspected, repaired or replaced at bench top level in a safe, controlled environment that is substantially free of contaminants.

The provision of novel drive train platform 50 also creates a space between the flight-producing components mounted atop it and the fuselage of the aircraft, thereby facilitating pre-flight, ground run-up, and post-flight inspections. Moreover, the clearance space facilitates the detaching and attaching of the various electrical cables, hydraulic lines, and the like when drive train platform 50 is being removed or reattached, respectively. In some cases, the clearance space enables the removal of parts that are behind access-blocking parts that do not need to be removed, but which must be removed to provide access to parts that must be removed when performing maintenance on a conventional helicopter.

The novel drive train can also reduce injuries during crashes or hard landings by providing a broad support base for the transmission and rotary propulsion mechanism. The broad base spreads out the load and can therefore prevent said mechanism from punching through the fuselage during a crash, hard landing, or other abrupt stoppage.

The modularity aspect of this invention also extends to the flight control component means of the hydraulic servo means. This enables mechanical connection means to the modular cockpit means. Specifically, as is clear from FIG. 2, vertical tubes, collectively denoted 29 (behind the second seat) translate cyclic controls 27, 28 to hydraulic control 51. When drive train platform 50 is removed from the air frame of helicopter 10, about three bolts are disconnected between said drive train platform 50 and said airframe, with vertical tubes 29 remaining within cockpit 20.

Those familiar with helicopter maintenance procedures will fully appreciate the many benefits provided by this invention, not all of which have been recited herein.

It will be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A helicopter construction, comprising:

a cockpit section of modular construction;

a central frame section of modular construction; and a tailboom section of modular construction;

first attachment means for connecting a trailing end of said modular cockpit section to a leading end of said modular central section; and second attachment means for connecting a trailing end of said modular central frame section to a leading end of said tailboom section;

a fuselage formed by said attachment of said cockpit section, said central frame section, and said tailboom section;

whereby differing modular cockpit sections may be selectively connected to differing modular central frame sections;

whereby differing modular central frame sections may be connected to differing modular tailboom sections;

whereby different combinations of said differing modular sections are formed to provide differing helicopters for use in differing tasks.

2. The helicopter construction of claim 1, further comprising:

a drive train platform of modular construction;

said drive train platform adapted to be releasably attachable in surmounting relation to said fuselage.

3. The helicopter construction of claim 2, further comprising:

a plurality of flight-providing components detachably secured to said drive train platform;

said plurality of flight-providing components being interconnected to one another;

whereby removing said drive train platform from said helicopter also removes said flight-providing components therefrom and maintains said flight-providing components in interconnected relation to one another.

4. The helicopter construction of claim 3, wherein said flight-providing components include a servo means, a transmission and rotary propulsion unit, an engine, and an engine oil cooling means.

5. The helicopter construction of claim 4, wherein each of said flight-providing components is independently replaceable with another flight-providing component having a different capability so that the drive train platform is reconfigurable for differing tasks, thereby avoiding a need to acquire differing complete helicopters for differing tasks.

6. The helicopter construction of claim 1, wherein said cockpit construction includes a fore and aft construction.

7. The helicopter construction of claim 1, wherein said central frame section includes an access opening that is selectively closable by a roll-away door means.

8. The helicopter construction of claim 7, wherein said central frame section includes an avionics compartment and a battery compartment.

9. The helicopter construction of claim 1, further comprising a modular landing sled section releaseably attachable to an underside of said fuselage;

whereby differing modular landing sled sections may be connected to differing fuselages.

10. A means for facilitating inspection, maintenance, and repair of a helicopter drive train, comprising:

a drive train platform releasably attached to a fuselage of said helicopter, in surmounting relation thereto;

said drive train platform adapted to support predetermined primary parts of a helicopter drive train so that said predetermined primary parts are removable as a unit from said fuselage when said drive train platform is removed from said fuselage.

11. The means of claim 10, wherein said predetermined primary parts include a servo means, a transmission and propulsion unit, an engine, and an engine oil cooling means.

12. The means of claim 10, wherein said fuselage is formed of modular components, including a modular cockpit means, a modular central frame section, and a modular tailboom section.

* * * * *